(12) United States Patent
Hoehne

(10) Patent No.: US 7,319,227 B2
(45) Date of Patent: Jan. 15, 2008

(54) CRYOGENIC DETECTOR DEVICE

(76) Inventor: Jens Hoehne, Sendlinger Strasse 22, Munich (DE)

( * ) Notice: Subject to any disclaimer, the term of this patent is extended or adjusted under 35 U.S.C. 154(b) by 0 days.

(21) Appl. No.: 11/280,891

(22) Filed: Nov. 16, 2005

(65) Prior Publication Data

US 2006/0102842 A1    May 18, 2006

Related U.S. Application Data

(63) Continuation of application No. PCT/EP2004/004080, filed on Apr. 16, 2004.

(30) Foreign Application Priority Data

Apr. 17, 2003    (DE) ................. 103 17 888

(51) Int. Cl.
*H01L 27/00*    (2006.01)
(52) U.S. Cl. ................. 250/336.2
(58) Field of Classification Search ......... 250/336.2
See application file for complete search history.

(56) References Cited

U.S. PATENT DOCUMENTS

| | | | | |
|---|---|---|---|---|
| 4,986,077 | A * | 1/1991 | Saho et al. | 62/51.1 |
| 5,880,468 | A | 3/1999 | Irwin et al. | 250/336.2 |
| 6,230,499 | B1 | 5/2001 | Hohne | 62/6 |
| 6,528,814 | B1 * | 3/2003 | Frank et al. | 257/30 |

FOREIGN PATENT DOCUMENTS

| | | |
|---|---|---|
| DE | 19849733 A1 | 10/1998 |
| DE | 19909048 A1 | 3/1999 |
| DE | 10164428 A1 | 12/2001 |
| EP | 1014056 A2 | 12/1999 |
| WO | WO 03/003050 | 6/2001 |

OTHER PUBLICATIONS

F. Gatti, P. Meunier: "A 3.9 K transition edge particle detector with DC-SQUID read-out and temperature stabilization" INFN-TC, Instituto Nazionale di Fisica Nucleare, Sezione di Genova, Jan. 25, 1996, pp. 1-7; XP002310221.
D. A. Wollman, Hilton, Irwin, Gergren, Rudman, Newbury, Martinis: "Cryogenic microcalorimeters for x-ray microanalysis" NCSL Workshop and Symposium, 1999, pp. 811-819; XP002310222.
"Pulsroehrenkuehler: Neue Kaeltemaschinen fuer die Supraleitertechnik und Kryoelecktronik," Info-Phys-Tech No. 6, VDI Technologiezentrum Physikalische Technologien, Feb. 1996, 4 pages.

* cited by examiner

*Primary Examiner*—David P. Porta
*Assistant Examiner*—Christopher G Webb
(74) *Attorney, Agent, or Firm*—Imperium Patent Works; Darien K. Wallace

(57) ABSTRACT

A cryogenic detector device includes a sensor based on a low-temperature effect and measures the temperature increase produced by the introduction of energy, such as an X-ray quantum. The smaller the thermal capacity of the sensor, the greater the temperature increase resulting from the introduction of energy and the higher the energy resolution of the sensor. Because the thermal capacity is temperature dependent, the sensor is operated in the range of comparatively small thermal capacities, i.e., in a range between 50 and 400 mK. Contrary to conventional assumptions, it was found that by keeping the three-dimensional size of the individual sensors sufficiently small and by increasing the effective sensor area, acceptable measurement results were achieved even at higher operating temperatures of the sensors in a range between 2.4 and 4.2 degrees Kelvin.

25 Claims, 6 Drawing Sheets

CRYOGENIC DETECTOR DEVICE

CROSS REFERENCE TO RELATED APPLICATION

This application is filed under 35 U.S.C. § 111(a) and is based on and hereby claims priority under 35 U.S.C. § 120 and § 365(c) from International Application No. PCT/EP2004/004080, filed on Apr. 16, 2004 and published as WO 2004/092770 A3 on Oct. 28, 2004, which in turn claims priority from German Application No. 103 17 888.0, filed on Apr. 17, 2003. This application is a continuation of International Application No. PCT/EP2004/004080, which is a continuation of German Application No. 103 17 888.0. International Application No. PCT/EP2004/004080 is pending as of the filing date of this application, and the United States is an elected state in International Application No. PCT/EP2004/004080. This application claims the benefit under 35 U.S.C. § 119 from German Application No. 103 17 888.0, filed on Apr. 17, 2003, in Germany. The disclosure of each of the foregoing documents is incorporated herein by reference.

TECHNICAL FIELD

The present invention relates generally to cryogenic detector devices used in analytical applications for examining particles, radiation and fields. More specifically, the invention relates to a detector system with a sensor that is cooled by a mechanical cooler.

BACKGROUND

Cryostats are used to cool sensors (often referred to as cryogenic detectors or cryodetectors) that are based on a low temperature effect. These cryostats have typically included a first cooling means, as well as a second cooling means that is pre-cooled by the first cooling means. The sensor is thermally coupled to the second cooling means. In order to generate a temperature of approximately 4° K (degrees Kelvin), the first cooling means typically consists of a coupled nitrogen/helium cooler. The second cooling means requires more space and involves more complex processes. The liquid coolant (nitrogen, helium) used by the first cooling means is both expensive and not available in every location. For this reason, the use of sensors based on a low-temperature effect is relatively expensive and generally unsuitable for industrial purposes.

Another cooling means for a cryostat involves a refrigerating machine having the form of a pulse-tube cooler. Such a pulse-tube cooler is described in Info-Phys-Tech No. 6, 1996, from VDI Technologiezentrum, Physikalische Technologien. The pulse-tube cooler includes a pulse tube with a cold heat exchanger at one end and a hot heat exchanger at the other end. The cold head exchanger absorbs heat from the outside, and the hot heat exchanger releases heat to the outside. The refrigerating machine also includes a regenerator that serves as an intermediate heat reservoir, and a pressure oscillator that generates periodic pressure changes. At the end where the cold heat exchanger is located, the pulse tube is connected to the pressure oscillator. Lines connect the pulse tube to the pressure oscillator through the regenerator so that the working gas is periodically shifted between the pulse tube and the pressure oscillator.

A cryodetector with a pulse-tube cooler is described in U.S. Pat. No. 6,230,499, which is related application of European Patent EP 1014056 A2. The cryodetector includes a first cooling means in the form of a two-stage pulse-tube cooler and second cooling means in the form of a demagnetization stage. A 3He/4He dilution refrigerator or a 3He cooler can be used for the second cooling means. Pre-cooling to approximately 4° K is performed by the pulse-tube cooler. Further cooling to the operating temperature of the sensors based on a low-temperature effect in a range of 50-400 mK is performed by the second cooling means.

The price of such a cryodetector device is considerable as a result of the complexity of the apparatus with the two cooling stages and extremely low operating temperatures. In addition, the diameter of the measuring probe is large to accommodate several infrared filters and shields around the probe, which are necessary due to the low operating temperatures.

A cryogenic detector device is sought that is less complex and costly and that has a smaller measuring probe.

SUMMARY

A sensor based on a low-temperature effect and employed in a cryogenic detector device measures the temperature increase produced by the introduction of energy, e.g., of an X-ray quantum. By keeping the thermal capacity of an individual sensor low, the energy resolution of the sensor is increased. The smaller the heat capacity of a sensor, the greater the temperature increase resulting from the introduction of energy and the higher the energy resolution of the sensor. The heat capacity is temperature dependent as opposed to constant. Thus, in order to achieve small heat capacities, the sensor is conventionally operated in a temperature range between 50 and 400 mK. But providing such low temperatures is very expensive and technically complicated.

Contrary to conventional assumptions, it was found that by keeping the three-dimensional size and structural volume of individual sensors sufficiently small and increasing the effective sensor area, acceptable measurement results can still be achieved even at higher operating temperatures of the sensors in a range between 2.4 and 4.2 degrees Kelvin (° K). Preferably, the operating temperature of the sensor is selected to be in a temperature range between 2.5 and 3.5 K. Even more preferred is a range between 2.6 and 2.9 K.

By enabling the higher operating temperatures of the sensors, less absorptive infrared filters are necessary in the inlet window. As a result, the efficiency of the sensors increases. Because the absorption of the radiation to be detected scales exponentially with the thickness of the filters, the efficiency of the sensors is especially high when low energies of radiation are to be detected. Moreover, reducing the amount of filters allows the diameter of the probe of the cryogenic detector device to be smaller. The smaller probe allows the cryogenic detector device to get closer to the sample, for example, in an electron microscope, and to achieve increased efficiency.

A cryogenic detector device includes an absorber that absorbs and thermalizes particles and radiation, and a sensor. The sensor is, for example, a phase transition thermometer and is positioned below or adjacent to the absorber.

The higher operating temperature of the cryogenic detector device allows the cooling to be achieved with a single, one-stage or multi-stage mechanical cooler. A second cooling stage that must be pre-cooled is not required. Therefore, the refrigerating capacity of the mechanical cooler can be reduced by about a factor of five. This leads to a less expensive and more compact design.

An X-ray lens is used as a means for enlarging the sensor area. This constitutes an uncomplicated and cost-effective way of increasing the active sensor area. As an alternative, the effective sensor area can also be increased using a sensor array comprised of a plurality of individual sensors. A one-stage or multi-stage pulse-tube cooler or a Gifford-McMahon cooler is used as the mechanical cooling means.

Various devices can be used as the sensors. Superconducting tunnel diodes, magnetic calorimeters, resistance thermometers, and phase transition thermometers can all be used as the sensors. Phase transition thermometers are preferred because the measurement of introduced energy can be detected directly through the increase of the temperature.

A temperature compensator stabilizes the operating temperature of the sensors. This is particularly advantageous when a pulse-tube cooler is used as the mechanical cooler. The final temperature in the range around 2.5 K generated by the pulse-tube cooler fluctuates slightly owing to the gas pulses. The temperature compensation can be achieved passively through limited thermal coupling between the mechanical cooler and the sensors, or actively through a heater element that stabilizes the sensors to an operating temperature $T_S > T_{minK}$.

A pre-amplifier is held at the same temperature as the sensors. This allows the length of the measurement signal lines between the sensors and the pre-amplifier to be reduced. The pre-amplifier and the sensors are part of the same integrated circuit. Thus, measurement errors that result from exposed measurement signal lines between the sensors and the pre-amplifier, such as bonding wires, are avoided.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
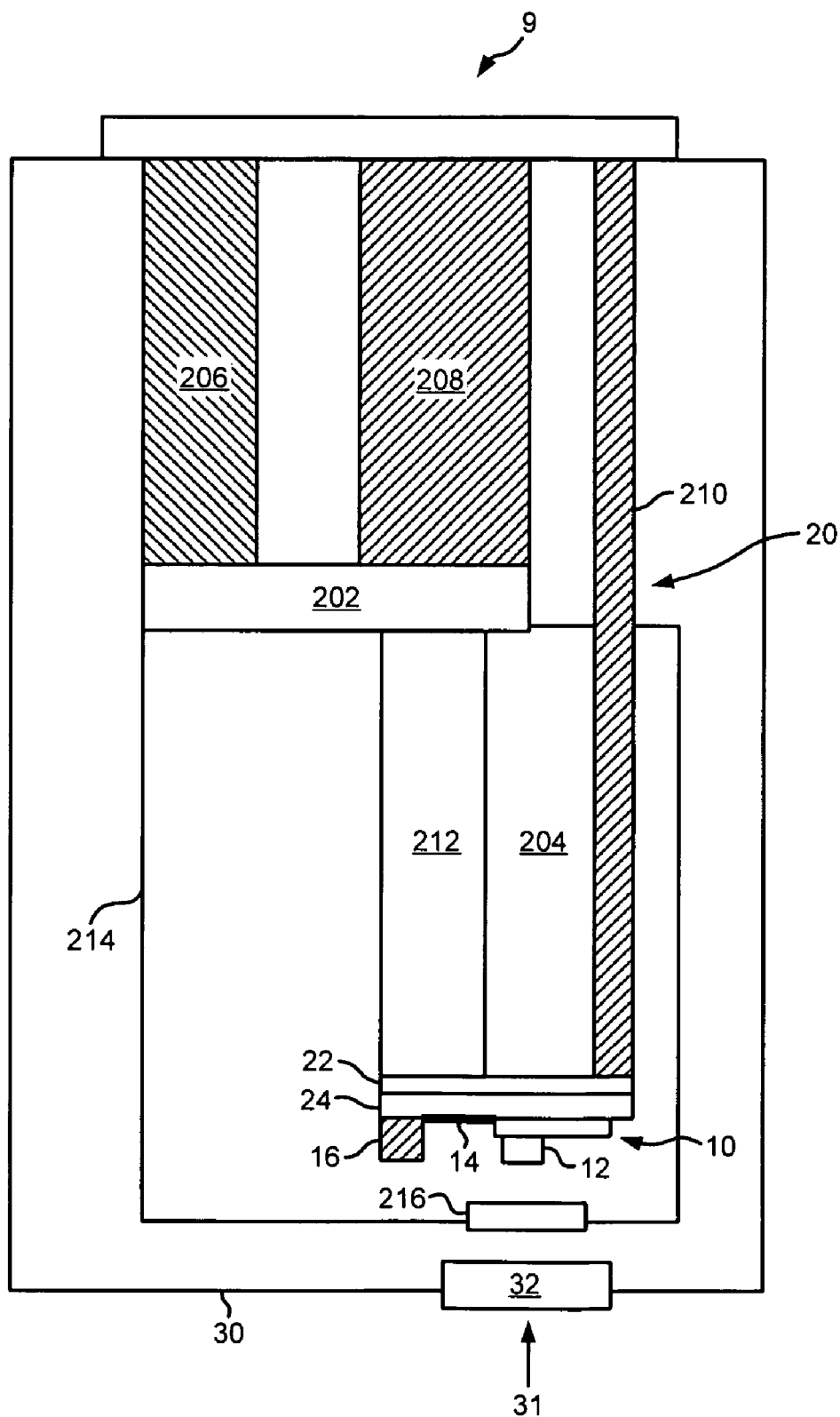
FIG. 1 is a schematic diagram of a detector system according to an embodiment of the invention.

FIG. 1 shows a detector system 9 with a cryogenic detector device 10 including a sensor 12 that is based on a low-temperature effect and that includes an active sensor area. Sensor 12 can be a superconducting tunnel diode, a magnetic calorimeter, a resistance thermometer, or a phase transition thermometer. Phase transition thermometers are preferred because the measurement of introduced energy can be detected directly through an increase in temperature. Depending on the device used for sensor 12, sensor 12 detects particles, radiation or fields. Cryogenic detector device 10 is connected to a pre-amplifier 16 through measurement signal lines 14. Pre-amplifier 16 and cryogenic detector device 10 are thermally coupled to mechanical cooler 20. Pre-amplifier 16 and cryogenic detector device 10 are arranged on a cold plate 22 having the minimum cooling temperature $T_{minK}$. The thermal coupling between cold plate 22 on one side and cryogenic detector device 10 and pre-amplifier 16 on the other side is relatively limited. A temperature compensator 24 or temperature buffer is placed between cold plate 22 on one side and cryogenic detector device 10 and pre-amplifier 16 on the other side.

In one embodiment, mechanical cooler 20 is a two-stage pulse-tube cooler. Temperature compensator 24 compensates and equalizes the slight fluctuations of the minimum cooling temperature $T_{minK}$ caused by the gas pulses of the pulse-tube cooler. Temperature compensator 24 reduces the fluctuations of the minimum cooling temperature $T_{minK}$ such that the operating temperature of sensor 12 stays within a range of +/−100 mK. In a preferred embodiment, temperature compensator 24 reduces the fluctuations of the minimum cooling temperature $T_{minK}$ to stabilize the operating temperature to within a range of +/−1 mK.

Sensor 12 outputs measurement signals onto the measurement signal lines 14. Pre-amplifier 16 amplifies the measurement signals output by sensor 12. Mechanical cooler 20, pre-amplifier 16 and cryogenic detector device 10 are arranged in a vacuum vessel 30. The particles, radiation or fields 31 to be measured or detected enter detector system 9 through a first inlet window 32 in vacuum vessel 30. Pre-amplifier 16 is held at the same temperature as sensor 12. This allows the length of the measurement signal lines 14 between sensor 12 and pre-amplifier 16, which are sensitive to disturbances, to be reduced.

A SQUID (Superconducting QUantum Interference Device) or a SQUID array is used as pre-amplifier 16. The SQUID or SQUID array is adapted as a pre-amplifier in a low-impedance electrical circuit. The temperature change of the thermometer is evident from the change of resistance that produces a change of current in the exciting coil of the SQUID. The voltage signal generated by the SQUID is then the starting point for determining the energies of the incident particles or radiation. Pre-amplifier 16 and sensor 12 can be part of an integrated circuit and arranged on a common chip. Thus, measurement errors owing to exposed measurement signal lines between sensor and pre-amplifier, such as bonding wires, are avoided. In the case where the pre-amplifier 16 and the sensor 12 are on separate substrates, the measurement signal lines 14 are rigidly connected to cold plate 22 in order to avoid disturbances of the measurement results resulting from mechanical movement of the measurement signal lines 14.

Pulse-tube cooler 20 includes a first stage 202 and a second stage 204. First stage 202 provides a cooling temperature of approximately 70 degrees Kelvin (K). Second stage 204 then provides the minimum cooling temperature $T_{minK}$ in a range between 2.4 and 4.0 K. First stage 202 includes a first pulse tube 206 and a first regenerator 208.

Second stage 204 includes a second pulse tube 210 and a second regenerator 212. Second cooling stage 204 includes a 77-K shield 214. In another embodiment, mechanical cooler 20 is a one-stage or multi-stage Gifford-McMahon cooler.

The 77-K shield 214 protects cold plate 22 from "warm" infrared radiation. Thus, cold plate 22 is exposed only to "cold" radiation below 77 K. A second inlet window 216 is located in the 77-K shield 214 between cryogenic detector device 10 and first inlet window 32. The particles, radiation or fields 31 to be detected arrive at cryogenic detector device 10 after passing through second inlet window 216. For additional information on the construction and the operation of a pulse-tube cooler, see Info-Phys-Tech No. 6, 1996, from VDI Technologiezentrum, Physikalische Technologien.

The active sensor area of sensor 12 is less than 50,000 $\mu m^2$. In comparison to conventional sensors having an area of approximately 80,000 $\mu m^2$, the smaller area of sensor 12 of cryogenic detector device 10 results in a reduced thermal capacity, which in turn allows the operating temperature to be increased to the desired range. When the structural volume of sensor 12 and the size of the active sensor area is reduced to enable an operating temperature range between 2.6 and 2.9 K, the active sensor area would no longer be sufficient to achieve reasonable measurement results without some additional improvements. Therefore, a sensor area enlargement means is provided to make a sufficiently large effective sensor area available. The sensor area enlargement means can be implemented, for instance, through an X-ray lens or through a sensor matrix having a plurality of individual sensors. Other implementations of the sensor area enlargement means are also possible. An X-ray lens is used, for example, where detector system 9 detects X-ray radiation. In another implementation, a sensor with a limited volume but with an increased effective sensor area measures energy in a scanning electron microscope at an operating temperature between 2.4 and 4.2 K.

Figure 2:
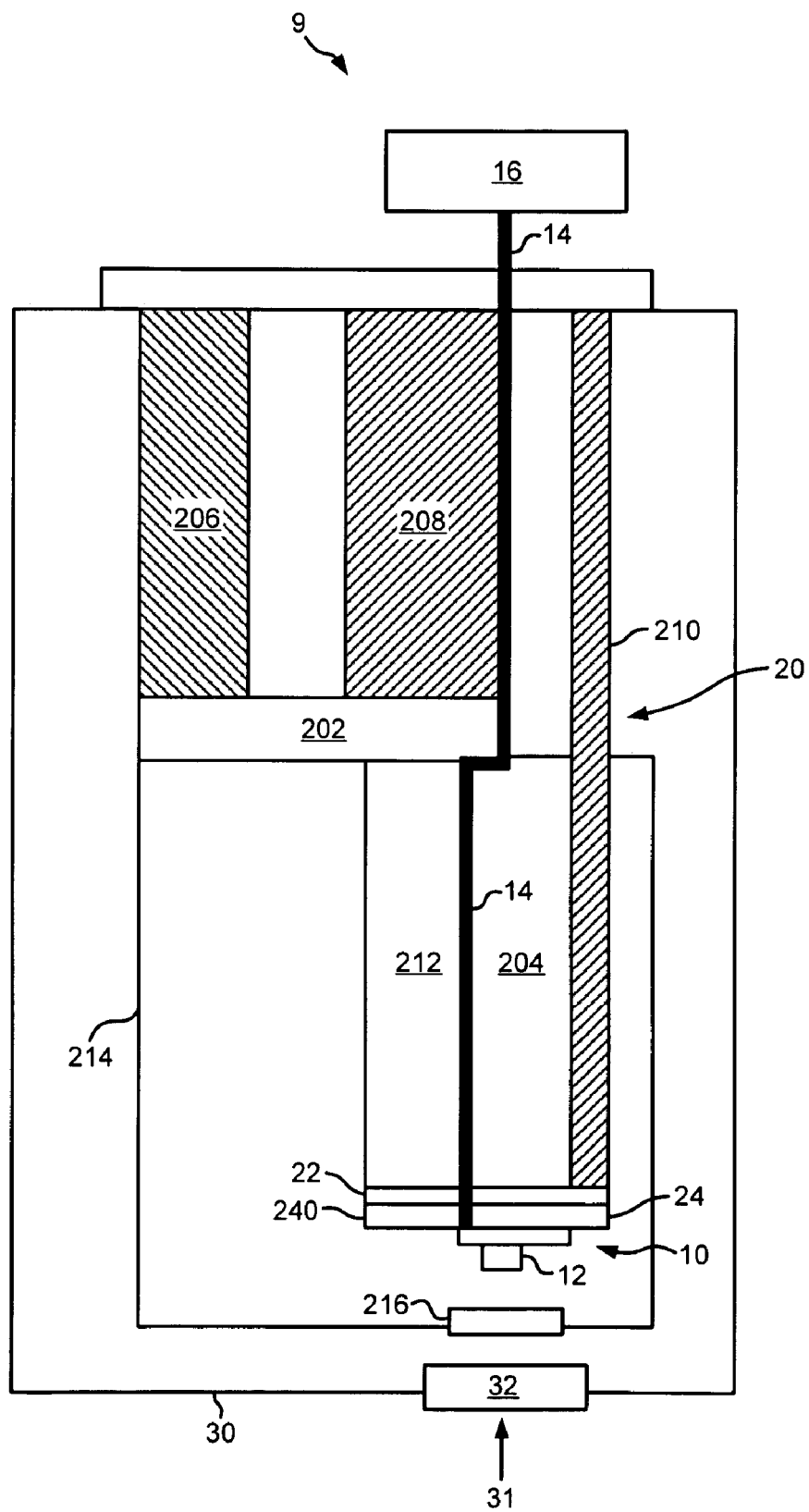
FIG. 2 is a schematic diagram of a detector system according to another embodiment of the invention.

FIG. 2 shows a second embodiment of detector system 9 in which pre-amplifier 16 is not located inside vacuum vessel 30. In this embodiment, pre-amplifier 16 is outside vacuum vessel 30 and is coupled to cryogenic detector device 10 by the measurement signal lines 14. In this embodiment, the measurement signal lines 14 are rigidly attached to mechanical cooler 20 so as to avoid mechanical vibrations of the measurement signal lines 14 and disturbances of the measurement signal.

As in the embodiment of FIG. 1, temperature compensator 24 is placed between cold plate 22 and cryogenic detector device 10. In the embodiment of FIG. 2, however, temperature compensator 24 is an active heating means 240. The heat provided by active heating means 240 slightly increases the minimum cooling temperature $T_{minK}$ and thus stabilizes the operating temperature range to a particular temperature. The operating temperature of the cryogenic detector device is stabilized slightly above the minimum cooling temperature $T_{minK}$. In the embodiment of FIG. 1, it is also possible to achieve active temperature compensation using active heating means 240 instead of achieving the passive temperature compensation provided by limited thermal coupling. It is also possible to apply passive temperature compensation through limited thermal coupling in the embodiment of FIG. 2.

Figure 3:
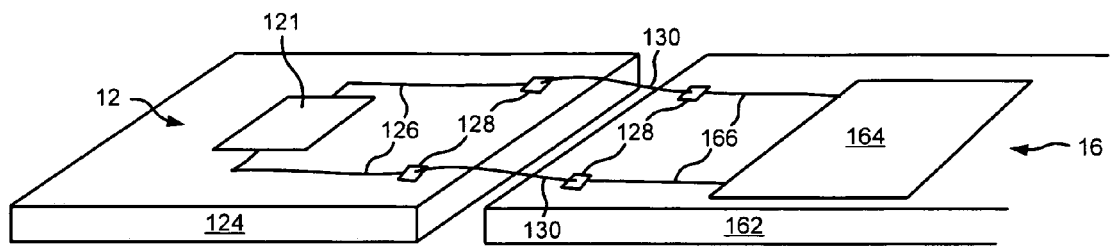
FIG. 3 is a diagram of a configuration of a sensor and a pre-amplifier that may be employed in the detector systems of FIGS. 1 and 2.

FIG. 3 shows one configuration of cryogenic detector device 10 and pre-amplifier 16. Sensor 12 includes an active sensor area 121 on a sensor semiconductor substrate 124. Measurement signal lines 126 originate from active sensor area 121 and lead to bonding pads 128. Pre-amplifier 16 includes electronic circuits 164 on a pre-amplifier semiconductor substrate 162. Thus, both sensor 12 and pre-amplifier 16 are in the form of integrated circuits. Measurement signal supply lines 166 originate from the electronic circuits 164 and lead to bonding pads 128. The two semiconductor substrates 124 and 162 are arranged in the immediate vicinity of each other so that the distance between the bonding pads 128 on the two semiconductor substrates 124 and 162 is as small as possible. The bonding pads 128 are electrically connected to each other through bonding wires 130. Thus, the measurement signal lines 14 of FIG. 1 are formed by the measurement signal connection lines 126, the bonding wires 130, and the measurement signal supply lines 166. This configuration of cryogenic detector device 10 and pre-amplifier 16 allows the length of the measurement signal lines 14 that is exposed and thus capable of vibration to be reduced. The bonding wires 130 correspond to the exposed portion of the measurement signal lines 14.

Figure 4:
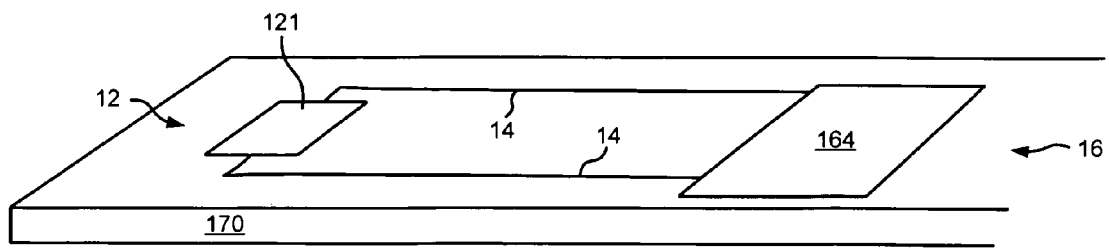
FIG. 4 is a diagram of another configuration of a sensor and a pre-amplifier that may be employed in the detector systems of FIGS. 1 and 2.

FIG. 4 shows another configuration of pre-amplifier 16 and cryogenic detector device 10. The length of the measurement signal lines 14 that is exposed and thus capable of vibration can be eliminated altogether by avoiding the short bonding wires 130 of the configuration of FIG. 3. In FIG. 4, both sensor 12 and pre-amplifier 16 are located on one integrated circuit on a common semiconductor substrate 170. In this configuration, the measurement signal lines 14 are implemented as traces or conductor lines of the integrated circuit.

Figure 5A:
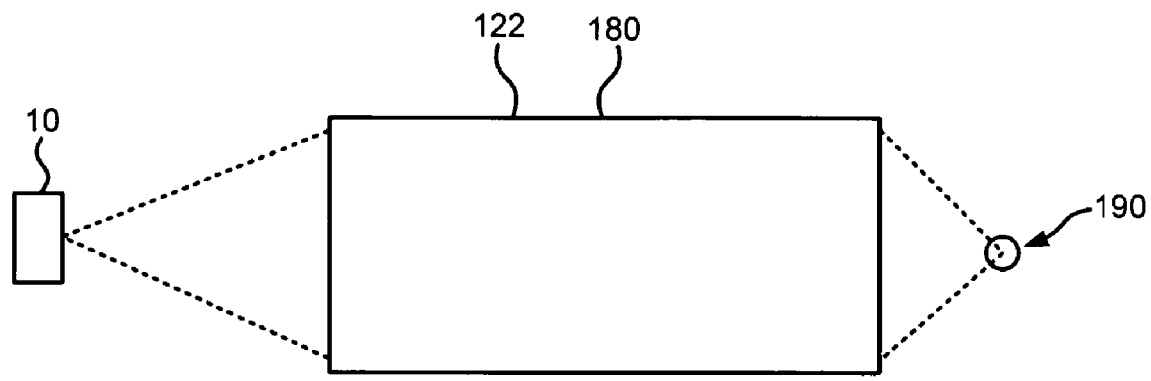
FIG. 5 is a diagram of an X-ray lens used to enlarge the area of the sensor of FIGS. 3 and 4.

FIG. 5A shows a sensor area enlargement means 122. The structural volume of sensor 12 and the active sensor area 121 are reduced to enable an operating temperature range between 2.4 and 4.2 K. By using sensor area enlargement means 122, an operating temperature range between 2.5 and 3.5 K can be achieved, and a range between 2.6 and 2.9 K was preferred. FIG. 5A shows an X-ray lens 180 used as sensor area enlargement means 122 in the detection of X-ray radiation. The X-ray radiation from a radiation source 190 is focused by X-ray lens 180 onto sensor 12 of cryogenic detector device 10. The dispersion angle of radiation source 190 using X-ray lens 180 covers and area greater than active sensor area 121.

Figure 5B:
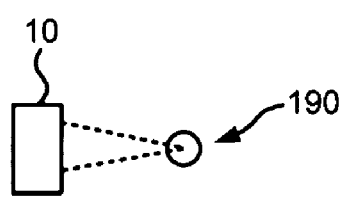

FIG. 5B shows in comparison the smaller dispersion angle of radiation source 190 in a configuration of detector system 9 that does not use an X-ray lens. The typical amplification factors achievable with X-ray lenses are between 10 and 100.

Figure 6A:
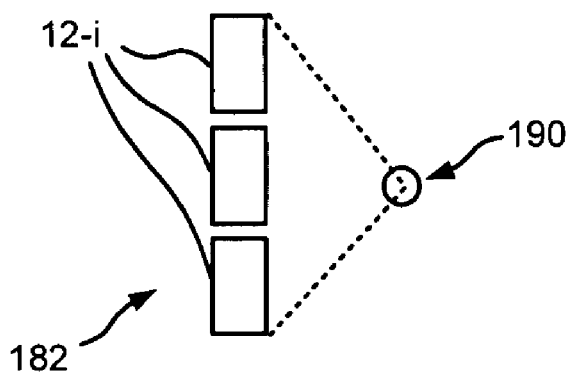
FIG. 6 is a diagram of a sensor matrix, including a plurality of individual sensors, used to enlarge the area of the sensor of FIGS. 3 and 4.
Figure 6B:
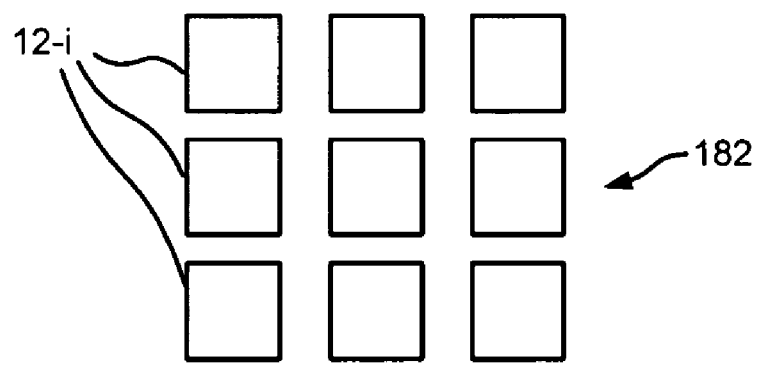

FIGS. 6A and 6B show an alternative sensor area enlargement means 122. The sensor area enlargement means 122 is implemented as a sensor matrix 182 having a plurality of individual sensors 12-$i$. The individual sensors are arranged in a matrix of rows and columns. The overall effective sensor area of sensor matrix 182 is the sum of the active sensor areas 121 of the individual sensors 12-$i$. FIG. 6A also shows that the dispersion angle of radiation source 190 that can be sensed is increased. This means that sensor matrix 182 allows detector system 9 to detect incident radiation 31 that exhibits a greater dispersion angle.

Figure 7:
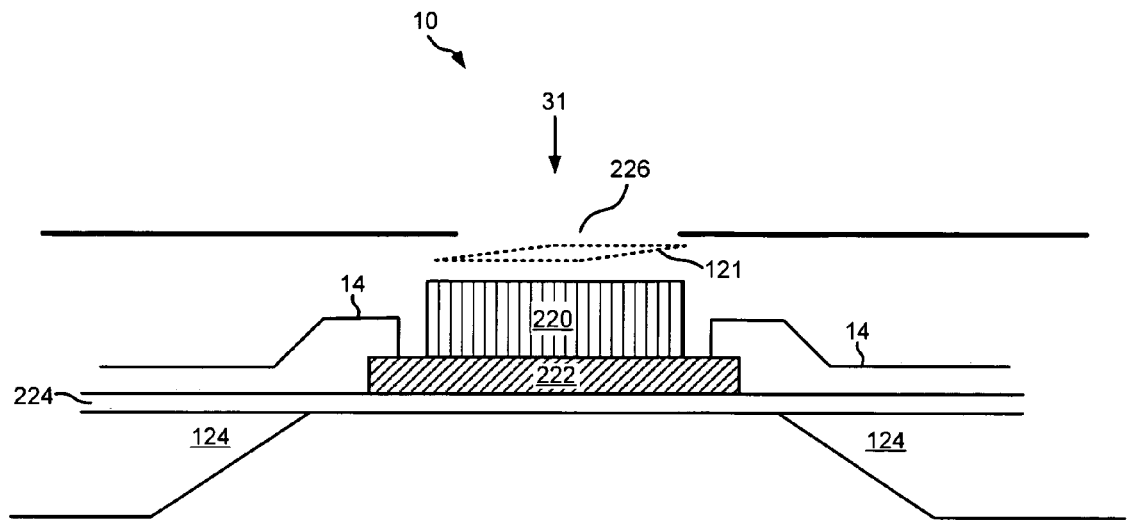
FIG. 7 is a side view of the structure of a cryogenic detector device that may be employed in the detector systems of FIGS. 1 and 2.

FIG. 7 is a side view of the structure of one embodiment of cryogenic detector device 10. Cryogenic detector device 10 includes an absorber 220 and sensor 12. Sensor 12 is a phase transition thermometer 222 in this embodiment. Absorber 220 is located on sensor 12, which is based on a low-temperature effect. Absorber 220 and phase transition thermometer 222 are arranged on a membrane 224, which in turn is thermally coupled to sensor semiconductor substrate 124. Phase transition thermometer 222 is electrically coupled to the measurement signal lines 14. An aperture 226 is located adjacent to absorber 220 and collimates the incident radiation, particles or fields 31 onto the absorber 220. Aperture 226, preferably surrounded by platinum, thus defines active sensor area 121.

Figure 8:
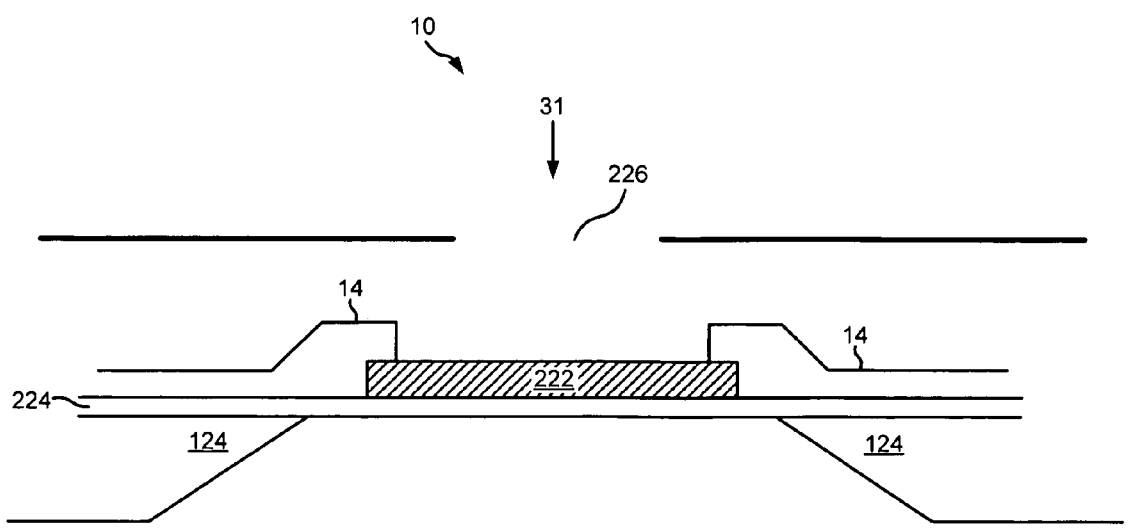
FIG. 8 is a diagram of yet another structure of a cryogenic detector device that may be employed in the detector systems of FIGS. 1 and 2.

FIG. 8 is a side view of the structure of another embodiment of cryogenic detector device 10. Unlike the structure of FIG. 7, the embodiment of FIG. 8 lacks and absorber. In this structure, the incident radiation, particles or fields 31 are absorbed directly by the phase transition thermometer 222 and thermalized.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A detector system, comprising:
    an individual sensor based on a low-temperature effect that outputs measurement signals, wherein the individual sensor includes an active sensor area;
    a mechanical cooler that is thermally coupled to the individual sensor and produces a minimum cooling temperature $T_{minK}$;
    a pre-amplifier connected to the individual sensor, wherein the pre-amplifier amplifies the measurement signals; and
    sensor area enlargement means for producing an effective sensor area that is larger than the active sensor area of the individual sensor, wherein the detector system has an operating temperature, and wherein the operating temperature of the detector system is stabilized slightly above the minimum cooling temperature $T_{minK}$.

2. The detector system of claim 1, wherein the individual sensor has a three-dimensional size that is small enough to enable an operating temperature range of the detector system between 2.4 and 4.2 K.

3. The detector system of claim 2, wherein the three-dimensional size of the individual sensor enables an operating temperature range of the detector system between 2.6 and 2.9 K.

4. The detector system of claim 1, wherein the active sensor area is less than 50,000 µm$^2$.

5. The detector system of claim 1, wherein the sensor area enlargement means is an X-ray lens.

6. The detector system of claim 1, wherein the sensor area enlargement means is a sensor matrix of a plurality of individual sensors, and wherein the individual sensor is one of the plurality of individual sensors.

7. The detector system of claim 1, wherein the detector system includes a single one-stage mechanical cooler.

8. The detector system of claim 1, wherein the mechanical cooler is a pulse-tube cooler.

9. The detector system of claim 1, wherein the mechanical cooler is a Gifford-McMahon cooler.

10. The detector system of claim 1, wherein the individual sensor is taken from the group consisting of: a superconducting tunnel diode, a magnetic calorimeter, a resistance thermometer, and a phase transition thermometer.

11. The detector system of claim 1, wherein the individual sensor has an operating temperature, and wherein the operating temperature of the individual sensor is stabilized by a temperature compensator.

12. The detector system of claim 11, wherein the temperature compensator allows limited thermal coupling between the mechanical cooler and the individual sensor.

13. The detector system of claim 1, wherein the minimum cooling temperature $T_{minK}$ fluctuates, and wherein the temperature compensator reduces the fluctuations of the minimum cooling temperature $T_{minK}$ to stabilize the operating temperature to within a range of +/−1 mK.

14. The detector system of claim 1, wherein the individual sensor and the pre-amplifier are part of a single integrated circuit.

15. The detector system of claim 1, wherein the pre-amplifier is a Superconducting QUantum Interference Device (SQUID).

16. The detector system of claim 1, wherein the individual sensor is held at a first temperature and the pre-amplifier is held at a second temperature, and wherein the first temperature equals the second temperature.

17. A detector system, comprising:
    an individual sensor based on a low-temperature effect that outputs measurement signals, wherein the individual sensor includes an active sensor area;
    a mechanical cooler that is thermally coupled to the individual sensor and produces a minimum cooling temperature $T_{minK}$;
    a pre-amplifier connected to the individual sensor, wherein the pre-amplifier amplifies the measurement signals; and
    sensor area enlargement means for producing an effective sensor area that is larger than the active sensor area of the individual sensor, wherein the individual sensor is held at a first temperature and the pre-amplifier is held at a second temperature, and wherein the first temperature equals the second temperature.

18. A detector system, comprising:
    an individual sensor based on a low-temperature effect that outputs measurement signals, wherein the individual sensor includes an active sensor area, wherein the individual sensor has an operating temperature, and wherein the operating temperature of the individual sensor is stabilized by a temperature compenHohner;
    a mechanical cooler that is thermally coupled to the individual sensor and produces a minimum cooling temperature $T_{minK}$;
    a pre-amplifier connected to the individual sensor, wherein the pre-amplifier amplifies the measurement signals; and
    sensor area enlargement means for producing an effective sensor area that is larger than the active sensor area of the individual sensor, wherein the minimum cooling temperature $T_{minK}$ fluctuates, and wherein the temperature compenHohner reduces the fluctuations of the minimum cooling temperature $T_{minK}$ to stabilize the operating temperature of the individual sensor to within a range of +/−100 mK.

19. A detector system, comprising:
    an individual sensor based on a low-temperature effect that outputs measurement signals, wherein the individual sensor includes an active sensor area, wherein the individual sensor has an operating temperature, and wherein the operating temperature of the individual sensor is stabilized by a temperature compenHohner;
    a mechanical cooler that is thermally coupled to the individual sensor and produces a minimum cooling temperature $T_{minK}$;
    a pre-amplifier connected to the individual sensor, wherein the pre-amplifier amplifies the measurement signals; and
    sensor area enlargement means for producing an effective sensor area that is larger than the active sensor area of the individual sensor, wherein the minimum cooling temperature $T_{minK}$ fluctuates, and wherein the temperature compenHohner reduces the fluctuations of the minimum cooling temperature $T_{minK}$ to stabilize the operating temperature to within a range of +/−1 mK.

20. A method comprising:
(a) measuring temperature using a sensor, wherein the sensor is held at a temperature between 2.4 and 4.2 K, and wherein the sensor has an active sensor area of less than 50,000 µm²;
(b) outputting a measurement signal; and
(c) amplifying the measurement signal using a pre-amplifier, wherein the pre-amplifier is held at a temperature between 2.4 and 4.2 K, wherein the sensor and the pre-amplifier are operated at the same temperature.

21. The method of claim 20, wherein the sensor is a phase transition thermometer.

22. The method of claim 20, wherein the sensor has an effective sensor area, further comprising:
(d) enlarging the effective sensor area using an X-ray lens.

23. The method of claim 20, wherein the sensor has an effective sensor area, and wherein the effective sensor area is enlarged using a sensor matrix of individual sensors.

24. The method of claim 20, wherein the sensor and the pre-amplifier are part of a single integrated circuit.

25. The method of claim 20, wherein the measuring in (a) is performed in a scanning electron microscope.

* * * * *